(12) United States Patent
Kelkar et al.

(10) Patent No.: US 7,230,580 B1
(45) Date of Patent: Jun. 12, 2007

(54) DESIGN OF A TWO INTERCONNECT IC CHIP FOR A RADIO FREQUENCY IDENTIFICATION TAG AND METHOD FOR MANUFACTURING SAME

(75) Inventors: Nikhil V. Kelkar, San Jose, CA (US); Sadanand R. Patil, San Jose, CA (US); Cheol Hyun Han, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 482 days.

(21) Appl. No.: 10/651,683

(22) Filed: Aug. 29, 2003

(51) Int. Cl.
*H01Q 7/00* (2006.01)

(52) U.S. Cl. ............... 343/870; 343/720; 343/895; 340/572.7

(58) Field of Classification Search ........... 343/720, 343/895, 795, 870; 340/572.1, 572.7
See application file for complete search history.

(56) References Cited

U.S. PATENT DOCUMENTS 6,100,804 A    8/2000  Brady et al. ........... 340/572.7
6,249,227 B1*  6/2001  Brady et al. ........... 340/572.1
6,509,217 B1   1/2003  Reddy .................... 438/153

FOREIGN PATENT DOCUMENTS

EP    1167068 A1 *  1/2002
WO    WO/03/063211 *  7/2003

\* cited by examiner

*Primary Examiner*—Michael C. Wimer
(74) *Attorney, Agent, or Firm*—Beyer Weaver LLP (57) ABSTRACT

An apparatus and method for attaching antennae to RFID tags is disclosed. Included is the use of RFID tags having a symmetrical interconnect system for attaching one or more antennae, such that virtually any rotational orientation of the RFID tag will result in a successful antennae attachment. Two oversized and "L" shaped gold-bumped poles can be arranged on the same side of a chip in an opposing fashion, such that at least one axis of symmetry is formed. Accordingly, virtually all rotational orientations of the chip are then acceptable when attaching a pair of opposing pole antenna leads. Alternatively, a pair of poles can be located on opposing chip surfaces, such that antenna substrates can attach to both the top and bottom of the chip to form a product "sandwich," whereby the rotational orientation of the chip is irrelevant at an antenna attachment step.

15 Claims, 5 Drawing Sheets

DESIGN OF A TWO INTERCONNECT IC CHIP FOR A RADIO FREQUENCY IDENTIFICATION TAG AND METHOD FOR MANUFACTURING SAME

TECHNICAL FIELD

The present invention relates generally to an apparatus and method for connecting components to an integrated circuit device, and more specifically to an apparatus and method for attaching RFIDICs to antennae.

BACKGROUND

Radio Frequency Identification ("RFID") tags and systems have been widely adopted in recent years for the traceability and tracking of a wide variety of products and objects. Although these wireless systems are similar to UPC bar code type systems in that they allow for the non-contact reading of various products, items and devices, they are an effective improvement over UPC bar code systems in a variety of ways. In fact, RFID tags and systems can be vastly superior to bar code systems in many manufacturing and other hostile environments where bar code labels are inconvenient or wholly impractical. A significant advantage of RFID tags and systems is the non-line-of-sight nature of the technology, whereby tags can be read through a variety of substances such as snow, fog, clothing, paint, packaging materials or other visually challenging conditions where UPC bar codes or other optically read technologies would be useless.

Another advantage is that RFID tags can also be read at relatively high speeds, frequently in less than 100 milliseconds per tag, which can result in the ability of an RFID system to read hundreds of tags per second when combined with the non-line-of-sight nature of the technology. The read/write capability of an active RFID system can also be a significant advantage in applications where changes in the data for individual items is desired, such as work-in-process or maintenance tracking. In addition, most RFID tags comprise a user-programmable code that is typically 32 to 128 bits, whereby RFID tags can record much more information than a standard bar code, including items such as, for example, a unique identification code, where a device was manufactured, where it was sold, and who purchased the device.

RFID tags come in a wide variety of shapes and sizes, and are usually noted for their particularly small and unobtrusive nature. Large RFID tags include, for example, the hard plastic anti-theft devices attached to merchandise in stores, credit-card shaped tags for use in access applications, and screw shaped tags for use with trees or wooden items. In smaller versions, animal tracking tags inserted beneath the skin can be as small as a pencil lead in diameter and one-half inch in length. Tiny RFID tags can be even of a size on the order of a flat square measuring about 500 microns per side (i.e., the size of a flake of pepper), although tags this small typically require an antenna of at least a half an inch to four inches or more, depending on the application. Applications and venues utilizing some form of RFID tags and systems vary dramatically and can include, for example, package delivery, luggage handling, highway toll monitoring, livestock identification, and automated vehicle identification systems, among others. In addition, RFID tags can be implemented in a wide variety of general product inventory and tracking applications that range from washable RFID tags designed to be sewn into clothing to specially designed RFID tags and antennae for automobile tires. Even the European central bank is considering embedding tiny RFID tags into banknotes by 2005.

In most applications, an ordinary RFID system comprises essentially three primary components: 1) one or more transceivers for transmitting and receiving radio frequency signals, 2) at least one transponder electronically programmed with data, preferably comprising unique information, and 3) at least one antenna. The transceiver is generally analogous to a bar code scanner, and controls communication within the system by restricting when and where data is written, stored and acquired. The transponder is generally analogous to a bar code label, and typically comprises at least a small chip containing an integrated circuit, with this chip often being referred to as an RFID Integrated Circuit ("RFIDIC"). Antennae are essentially the conduits between RFIDICs and transceivers, as RFIDICs are frequently too small to act as their own antennae and collect a sufficient level of emitted radio signals standing alone. Antennae can be attached to the transceiver, the transponder, or both, and are generally used to emit and/or collect radio signals to activate an RFIDIC, read data from the RFIDIC and/or write data to it.

In general, the term "RFID tag" refers to the combination of the RFIDIC and the antennae attached thereto. An RFID tag is essentially a miniscule microchip, with attached antennae, that listens for a radio query and responds by transmitting an identification code that is frequently unique to that RFID tag. In operation, the transceiver generally emits radio waves in ranges of anywhere from a fraction of an inch to 100 feet or more, depending upon the power output and radio frequency utilized. When an individual RFID tag passes through an electromagnetic zone covered by the transceiver, it detects the activation signal of the transceiver and responds by emitting its individual recorded code. The "reader" or transceiver then collects this emitted code and passes this data along to a host computer or other like device for processing.

RFID tags are typically categorized as either active or passive. Active RFID tags are usually powered by an internal battery, can potentially even include a mini-processor, and can advantageously have read/write capabilities. Such active tags, however, tend to be relatively large and costly and tend to have a limited operational life. Conversely, passive RFID tags operate without a separate external power source, as power sufficient to operate a passive RFID tag is actually generated from the radio waves emitted by the transceiver. Although such passive tags generally cannot comprise a mini-processor or have read-write capabilities, they tend to be smaller, lighter and less expensive than active tags, and have a potentially infinite operational life. Such passive or "read-only" type tags are typically "write-once" type of integrated circuits, programmed with a unique set of data that cannot be modified, and essentially operate as a static data entry into a database, similar to the way that UPC bar codes are used. Due in part to the relative simplicity and lower costs, the majority of actual RFID tags fall into the "passive" category.

A wide variety of antenna materials and types are possible for RFID tags, and such antenna materials can include thin strips or traces of metal or other conducting material fabricated onto a specifically designed substrate or other medium. Such a medium can be specially provided, or actually built into the product containing the RFID tag. In one example, the military is working with RFID designs where the antennae are conducting threads built into the clothing of personnel to be tracked in the field. Standard apparatuses and methods for manufacturing RFID tags are well known, and instances of such apparatuses and methods can be found, for example, in U.S. Pat. Nos. 6,100,804 and 6,509,217, both of which are incorporated herein by reference in their entirety.

A major barrier to the broad adoption of tiny RFID tags and similarly advanced technologies in the thin-margin businesses of retail sales and consumer commodities has been the high cost of the equipment. For the tags alone, many manufacturers can expect to pay a relatively premium price per tag in low quantities. In quantities of about 1 billion, however, costs for RFID tags can drop significantly, and in lots of 10 billion or more, further reduced costs permitting for widespread adoption of the tags are hoped to be possible. In order for such low costs to be realized, however, it is generally accepted within the industry that significant improvements to and streamlining of the manufacturing process of such tags will be needed. One area where improvements may be possible is in the design and attachment of antennae to the RFID tag.

A typical passive RFID tag comprises a two pole RFIDIC connected to an antenna that is fabricated onto a substrate. Alternatively, a passive RFID tag can comprise a four pole RFIDIC with at least one and usually two of the poles connected to an antenna. Additional poles can either be "dummy" poles that do nothing, or can be used in conjunction with a battery or external power source, in the case of active or otherwise powered RFID tags. A wide variety of apparatuses and techniques exist for providing poles on RFIDICs to which antennae can be attached, with one example being gold bumps formed on an "active" side of the chip, such methods as will be readily known and understood by those skilled in the art. Advantages of techniques such as the formation of gold bumps to attach antennae include higher throughput, lower assembly costs, and the ease of accommodation with respect to differing sizes and shapes of RFIDICs and antennae.

Disadvantages of such techniques, however, tend to include the necessitated use of individual pick and place methods for orienting each RFIDIC during manufacture, such as before attaching each antenna to each RFIDIC. That is, the manufacture of RFID tags typically requires that any particular RFIDIC be oriented in a particular position before the antenna or antennae can be attached to the tag in an operable manner. Such specific orientation requirements result in the need for individualized handling of each RFIDIC to some degree, such that standard pick and place robotics or similar apparatuses or techniques are popularly used during the manufacturing process. The use of individual pick and place manufacturing devices and techniques, however, tends to result in a significantly slower and costlier manufacturing process, and precludes the use of many more favorable alternative bulk manufacturing methods and techniques.

Accordingly, there exists a need for improved apparatuses and methods for attaching antennae to RFIDICs that permits the use of more favorable bulk manufacturing methods and techniques, and specifically a need for improved RFIDIC designs and manufacturing techniques such that individualized pick and place devices and methods are minimized or eliminated.

SUMMARY

It is an advantage of the present invention to provide an apparatus and method for attaching antennae to RFID chips. According to one embodiment of the present invention, the provided apparatus comprises an RFID chip or RFIDIC having a symmetrical interconnect system for attaching one or more antennae, such that virtually any rotational orientation of the RFIDIC will still result in a successful attachment of the antennae thereto. Under such an embodiment, an appropriate method of implementation would include the steps of selecting a first RFIDIC, creating a plurality of antenna pole attachments on such an RFIDIC, utilizing a mass parts handling system to process the RFIDIC, and coupling a plurality of antenna leads to one or more of said antenna pole attachments.

Accordingly, the current invention specifies a pole arrangement and chip interconnect design by which an antenna attachment process can be accomplished independent of the rotational orientation of the chip (i.e., RFIDIC). One specific embodiment for accomplishing such a result involves the use of two oversized and "L" shaped poles, which are arranged on the same side of a chip in an opposing fashion, such that at least one axis of symmetry is formed. Under such an arrangement, virtually any rotational orientation of the chip will result in an acceptable orientation for connecting a pair of opposing antenna leads.

In an alternative embodiment of the present invention at least eight poles are used, with four poles designated for use with antenna leads, and four other poles designated for use with power or ground leads. The arrangement of these eight leads is such that at least one axis of symmetry is formed across the face of the RFIDIC, with one example being that all four of one type of pole are in the corners, while all four or the other type of pole are at the midpoint of each edge of the RFIDIC. Under such a symmetrical arrangement, at least four different rotational orientations of the chip will result in an acceptable orientation for connecting a pair of opposing antenna leads and a ground lead to the poles.

In yet another embodiment of the present invention a pair of poles is again used, only with the two connections on the RFIDIC being located on opposing chip surfaces. The connections to an antenna substrate can then be achieved by either using a flexible contact that was part of a chip carrier or by positioning the chip between two halves of an antenna wherein both sides of the chip are simultaneously attached to it. Such a result is possible through the use of, for example, a pair of continuously supplied antenna substrates onto which individual bulk-processed RFIDICs are fed, thereby forming a product "sandwich" of an RFIDIC between two antenna substrates.

As disclosed, the present invention allows for significantly higher throughput due to a total forgiveness of chip orientation in the assembly and manufacturing process, which is in turn a result of the symmetrical or otherwise strategically manipulative design of the pole arrangement and chip circuitry. Such higher throughput inevitably results in reduced costs, and in the present case, costs that are significantly reduced beyond any incremental costs increases required to implement the improved inventive chip and pole designs.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures for the disclosed inventive apparatus and method for attaching antennae to RFID chips. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

One advantage of the present invention is the elimination or reduction of the need for individualized pick and place devices and methods during the manufacturing of RFID tags. This advantage is accomplished at least in part via the improved design of the RFIDIC, and specifically the pole or antenna contact design on the RFIDIC, such that the need for a more precise orientation of the RFIDIC before attaching the antenna is minimized or eliminated.

Another advantage of the present invention is the inherent increase in manufacturing efficiency resulting from this elimination or reduction of the need for individualized pick and place devices and methods during the manufacturing of RFID tags. Such an advantage is realized where more efficient bulk processing devices and techniques are implemented in place of less efficient pick and place devices and techniques for handling and processing items during the manufacturing process.

Figure 1:
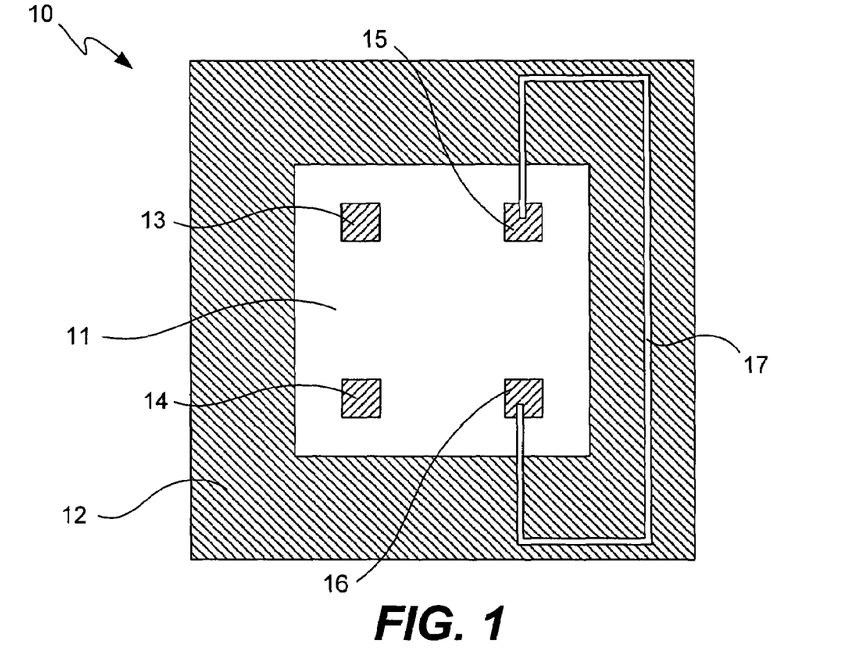
FIG. 1 illustrates in top plan view an exemplary RFID tag having a particular pole and antenna arrangement.

Turning now to FIG. 1, an exemplary RFID tag having a particular pole and antenna arrangement is illustrated in top plan view. It will be readily appreciated that various independent components within FIG. 1 are not necessarily to scale, especially with regard to the size and orientation of the antenna 17 with respect to the RFID tag 10. RFID tag 10 comprises an RFIDIC 11 and attached substrate or backing 12. RFIDIC 11 comprises four poles 13-16, which may be standard gold bump attachment type poles, for example, although other amounts and types of poles are also possible. Poles 13 and 14 can be dummy poles, battery adapted poles, or other use poles, while poles 15 and 16 are adapted for use with a looped antenna 17. Such adaptation would include the underlying circuitry connected to poles 15 and 16 being configured such that radio signals are to be received and input into the RFIDIC through those poles, as will be readily understood by those skilled in the art. Antenna 17 can comprise one or more metallic or otherwise conducting traces formed onto substrate or backing 12.

Due to its particular configuration, RFIDIC 11 must be oriented into a particular position before antenna 17 can be attached. If, for example, RFIDIC 11 is oriented 90, 180, or 270 degrees clockwise, this chip might appear to be oriented properly, but each of poles 13-16 would be in an incorrect position if the antenna 17 were to be attached ordinarily at the far right poles. Accordingly, the proper orientation of RFIDIC 11 must be accounted for, typically via individualized pick and place devices and methods, at least prior to the step of attaching the antenna and/or any other pole-attached components.

Figure 2:
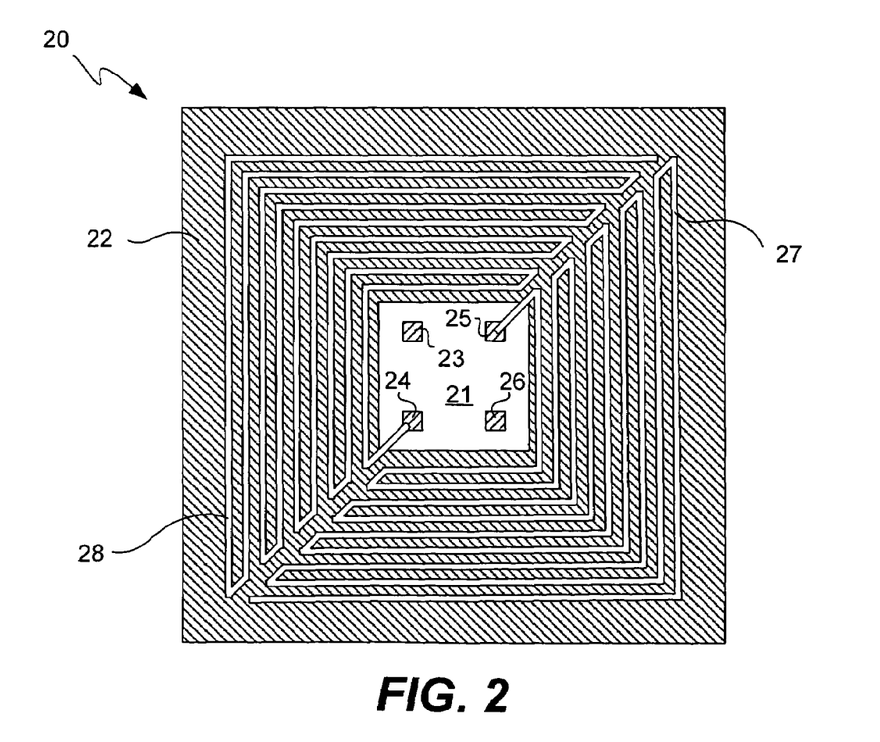
FIG. 2 illustrates in top plan view another exemplary RFID tag having an alternative antenna arrangement.

Referring now to FIG. 2, another exemplary RFID tag having an alternative antenna arrangement is illustrated in top plan view. Similar to RFID tag 10 discussed above, RFID tag 20 comprises an RFIDIC 21 and an attached substrate or backing 22. RFIDIC 21 similarly comprises four poles 23-26, which may be standard gold bump attachment type poles, for example, although other amounts and types of poles are also possible. Poles 23 and 26 can be dummy poles, battery adapted poles, or other use poles, while poles 24 and 25 are adapted for use with a pair of opposing antenna traces 27 and 28, with such adaptation again including the proper underlying RFIDIC circuitry being connected to poles 24 and 25. Antenna traces 27 and 28 can comprise one or more metallic or otherwise radio signal conducting traces formed onto substrate or backing 22 or onto an alternatively provided antenna support substrate or structure (not shown). If desired, substrate or backing 22 and antenna traces 27 and 28 can also be of much greater size than that which is illustrated, as will be readily understood by those skilled in the art.

Again, due to its particular configuration, RFIDIC 21 must be oriented into a particular position before antenna traces 27 and 28 can be attached to poles 24 and 25. If, for example, RFIDIC 21 is oriented 90 or 270 degrees clockwise, this chip might appear to be oriented properly, but each of poles 23-26 would be in an incorrect position if the antenna traces 27 and 28 were to be attached at poles ordinarily designated to be at the upper right and bottom left corners. RFID tag 20 will also typically operate in cases where RFIDIC 21 was rotated 180 degrees at the time of antenna attachment, such that antenna trace 27 was attached at pole 24 and antenna trace 28 was attached at pole 25. Depending upon the design of the chip circuitry, antenna polarity, and field signal placement, such a resulting operation will typically be normal and correct, especially for instances where a simple looped type antenna arrangement is used, or might also result in the emission of an incorrect data bit stream that could appear normal. Of course, such a reversed antenna attachment can be readily designed for via various pole and chip design techniques known in the art, such that an RFIDIC can operate under a reversed antenna attachment just as well as under the regular antenna attachment. Still, the orientation of the RFIDIC 21 would be improper in two of four potential positions in such instances, such that a proper orientation must still likely be accounted for during the manufacturing process.

Accordingly, one potential solution is to design RFIDIC 21 such that its shape is substantially rectangular but not square. In this manner, if the length of RFIDIC 21 were extended but the breadth were to remain the same, either orientation of the RFIDIC along a longer side (i.e., either 0 or 180 degrees) would result in antenna traces 27 and 28 being attached to poles 24 and 25. Assuming that the chip and pole designs and field signal placements are sufficiently adequate such that either attachment result is valid, and that the orientation of other poles is not critical, some bulk processing and sorting devices and methods, as described in greater detail below, might be then used to process such rectangular yet not square RFIDICs. Of course, the only such bulk processing devices and method that could be used would be those that could manage bulk or batch processed RFIDICs en masse and produce them in an orientation such that the longer sides of each RFIDIC are aligned in a given direction. While such a design may be advantageous in some ways, there are several drawbacks in a rectangular yet not square RFIDIC design that leave better designs to be desired.

Figure 3:
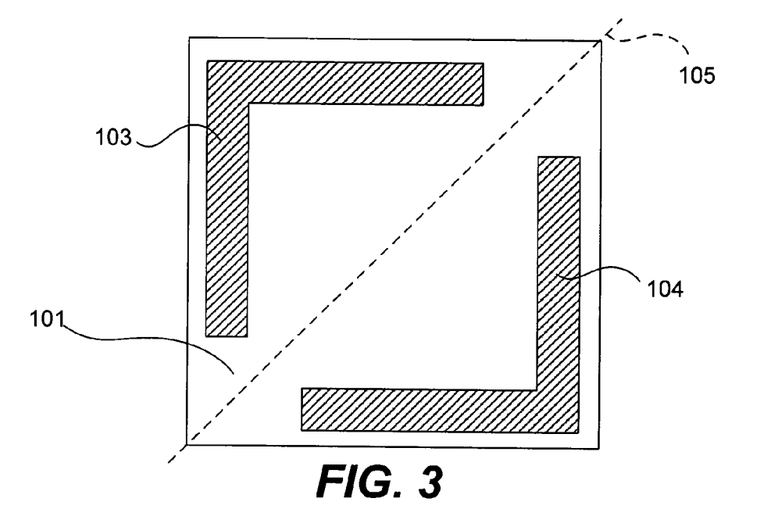
FIG. 3 illustrates in top plan view an exemplary RFIDIC having an alternative pole arrangement according to one embodiment of the present invention.
Figure 4:
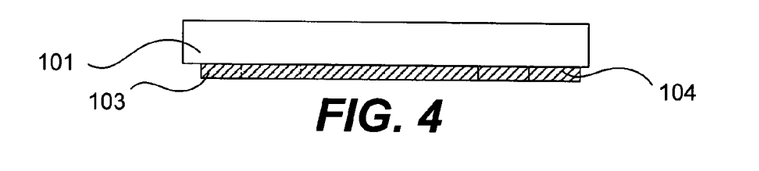
FIG. 4 illustrates in side elevation view the RFIDIC of FIG. 3 according to one embodiment of the present invention.

Turning now to FIGS. 3 and 4, an exemplary RFIDIC having an alternative pole arrangement according to one embodiment of the present invention is illustrated in top plan and side elevation views. RFIDIC 101 is preferably accompanied by an attached substrate or backing (not shown), as will readily understood by those skilled in the art, although such an attached substrate or backing is not absolutely necessary. RFIDIC 101 comprises two poles 103 and 104, which are preferably oversized gold bump attachment type poles, although other amounts and types of poles are also possible. Other poles, which are not shown here, can include dummy poles, battery adapted poles, or other use poles, and may be located on the same surface as poles 103 and 104, or elsewhere on the RFIDIC 101. As in the foregoing examples, poles 103 and 104 are adapted to be attached to one or more antenna leads, with such adaptations including the underlying chip circuitry connected to the poles being configured such that radio signals are to be received into and emitted from the RFIDIC through these poles, as will be readily understood by those skilled in the art.

As can be seen in FIG. 3, antenna poles 103 and 104 are formed along and near the edges of RFIDIC 101, and each is substantially "L" shaped in nature. In addition, it can be seen that the arrangement of antenna poles 103 and 104 is substantially symmetrical about at least one axis across the face of RFIDIC 101, such as, for example, diagonal axis 105. While such a pole formation may require the creation of larger than normal gold bump contacts, this arrangement of poles is instrumental in permitting a virtually infinite number of possible rotational orientations of the RFIDIC at the antenna attachment stage. In the typical instance of a simple RFID tag having a two-connection looped type antenna and capable of operating under both a normal and reversed attachment of the two antenna leads, virtually any rotational orientation of RFIDIC 101, with the exception of an orientation directly along symmetrical axis 105, will result in the correct placement of antenna leads at the time such leads are attached to poles 103 and 104.

Figure 5:
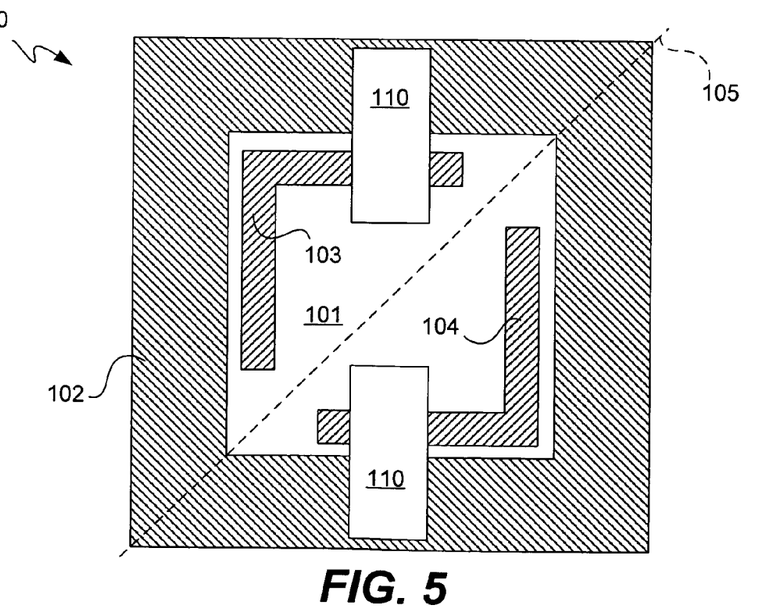
FIG. 5 illustrates in top plan view the RFIDIC of FIG. 3 having a particular antenna arrangement attached to form an RFID tag according to one embodiment of the present invention.

Referring now to FIG. 5, the RFIDIC of FIG. 3 further comprising antennae attached in one particular arrangement to form an RFID tag according to one embodiment of the present invention is illustrated in top plan view. RFID tag 100 comprises the RFIDIC 101 illustrated in FIGS. 3 and 4, but now has the contact ends of two antennae leads 110 attached to poles 103 and 104. In this illustrative example, it should be noted that the automated devices and methods used in the manufacturing process will attempt to attach opposing antennae leads 110 in the exact position and orientation as shown regardless of the position and orientation of an underlying RFIDIC being processed. As can be seen from FIGS. 3 and 5, however, any processed RFIDIC having any "squared" rotational orientation (i.e., 0, 90, 180 or 270 degrees from "normal") will still result in one antenna lead 110 being attached as designed to pole 103 and the other antenna lead 110 being attached as designed to pole 104, such that the entire RFID tag will operate normally.

Furthermore, any slight rotation of RFIDIC 101 from any of the four perfectly squared rotational orientations will result in slightly skewed rotational orientation whereby the normal attachment of antenna leads 110 will still result in a fully operable and functional RFID tag. In fact, due to the oversized nature and symmetrical arrangement of the two poles, even substantial rotations of the RFIDIC away from a squared rotational orientation will still result in a fully operable and functional RFID tag after a normal attachment of the two antenna leads. As shown in the pole arrangement of FIGS. 3 and 5, the only instance where a potential rotational orientation would possibly not work would be where diagonal axis 105 is aligned dead-on with the opposing antenna leads 110.

The existence of such an instance might be corrected by, for example, extending the gold bump or other connector of each pole further, or through the incorporation of a different symmetrical pole design and arrangement, which other types of similarly manipulative pole designs and arrangements, both symmetrical and asymmetrical, are also contemplated. Alternatively, it is thought that if RFIDIC orientations are truly random in a given handling process, that the relatively small number of RFIDICs that would be so affected by such a dead-on rotational orientation at the time of antennae attachment would merely constitute some portion of the number of defective products that are inherent to most manufacturing processes. Such manufacturing defects would ordinarily be caught and removed for scrap or recycling purposes at one or more various quality checkpoints at a later point in the process, and the relatively small costs incurred by such a small percentage of defects will be more than recovered through the increased advantages of being able to use better bulk processing devices and methods.

As a result of the symmetrical and oversized pole design and arrangement illustrated here, the automated processing of RFIDICs and attachment of antennae thereto can take place under virtually any rotational orientation of the RFIDIC at the time of antennae attachment (outside a "dead-on" orientation along an axis where zero or multiple contacts are possible). Such a result paves the way for the reduction or elimination of pick and place mechanisms and techniques, as bulk feeders and handlers can now be used to process RFIDICs much more quickly and in much greater numbers. Any incrementally increased costs that are incurred through the creation of the larger poles (e.g., gold bumps) necessary for this design are more than recovered in the costs saved through the increased speeds, efficiencies and throughputs of any implemented bulk handling type manufacturing processes. Of course, since the particular embodiment of an RFIDIC as depicted in FIGS. 3-5 has all of its poles on one side of the RFIDIC, it would be necessary for any utilized bulk handling device or process for this RFIDIC design to at least be able to orient the RFIDICs to be face up at some point in the handling process before the antennae are attached, which step is not a problem in many makes and models of bulk handlers and processors, further discussion of which are provided in greater detail below.

Figure 6:
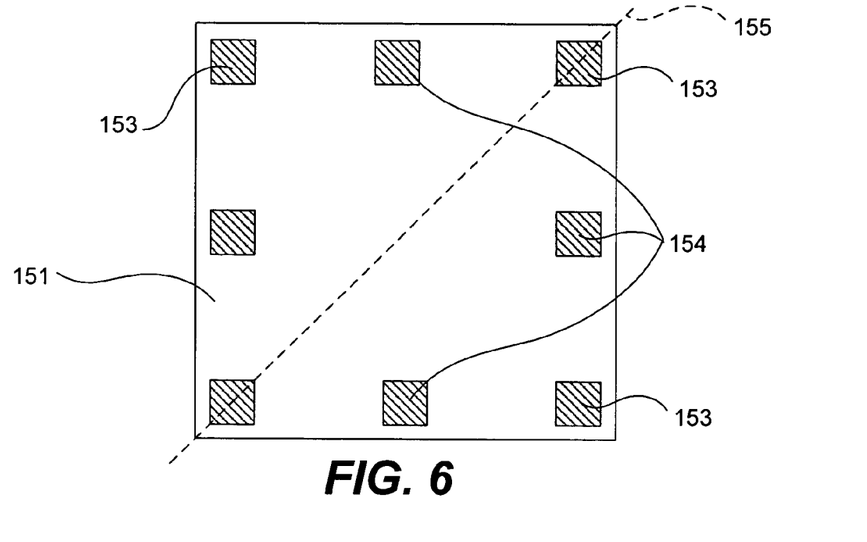
FIG. 6 illustrates in top plan view another exemplary RFIDIC having an alternative pole arrangement according to one embodiment of the present invention.
Figure 7:
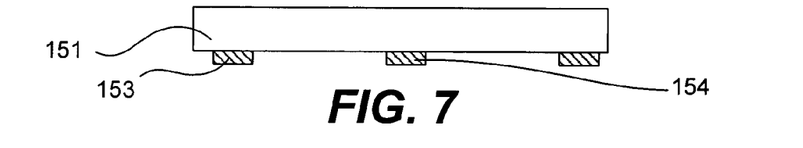
FIG. 7 illustrates in side elevation view the RFIDIC of FIG. 6 according to one embodiment of the present invention.

Turning now to FIGS. 6 and 7, another exemplary RFIDIC having an alternative pole arrangement according to one embodiment of the present invention is illustrated in top plan and side elevation views. Similar to the foregoing embodiment, RFIDIC 151 is preferably accompanied by an attached substrate or backing (not shown), as will be readily understood by those skilled in the art. RFIDIC 151 comprises an arrangement of eight poles of two different types, 153 and 154, which are preferably gold bump type poles, although other amounts and types of poles are also possible. Each of the four corner poles 153 are adapted to be attached to one or more antenna leads, with such adaptations including the underlying chip circuitry connected to the poles being configured such that radio signals can be received into and emitted from the RFIDIC through these poles, as will be readily understood by those skilled in the art. Conversely, each of the four side poles 154 are adapted to be attached to one or more power or ground leads, with such adaptations including the underlying chip circuitry connected to the poles being configured such that appropriate ground or power leads are processed within the RFIDIC from these poles, as will be readily understood by those skilled in the art. For purposes of further discussion herein, it will be assumed that each of the four side poles 154 is a ground pole. Other poles not shown here can include dummy or other use poles, and may be located on the same surface as poles 153 and 154, or elsewhere on the RFIDIC 151.

As can be seen in FIG. 6, the four antenna poles 153 are all formed at or near each corner of RFIDIC 151, with each being of ordinary size and shape. Similarly, the four ground poles 154 are all formed at or near the midpoint of each edge of RFIDIC 151, again with each pole being of ordinary size and shape. Hence, according to this embodiment, oversized or irregularly shaped gold bumps are entirely unnecessary. It can thus be seen that the arrangement of antenna and ground poles 153 and 154 is substantially symmetrical about at least one axis across the face of RFIDIC 151, such as, for example, diagonal axis 155. Other potential axes of symmetry include the other diagonal axis, a central horizontal axis and a central vertical axis. This arrangement of poles not only allows a ground lead to be attached in addition to one or more antennae, but is also instrumental in permitting at least four different rotational orientations of the RFIDIC at the antenna and ground lead attachment stages. Basically, any orientation of the RFIDIC wherein any of the four sides are aligned in a particular direction, such as along a guide rail or other simple orienting tool, will be a proper orientation for attaching antennae and a ground lead.

Figure 8:
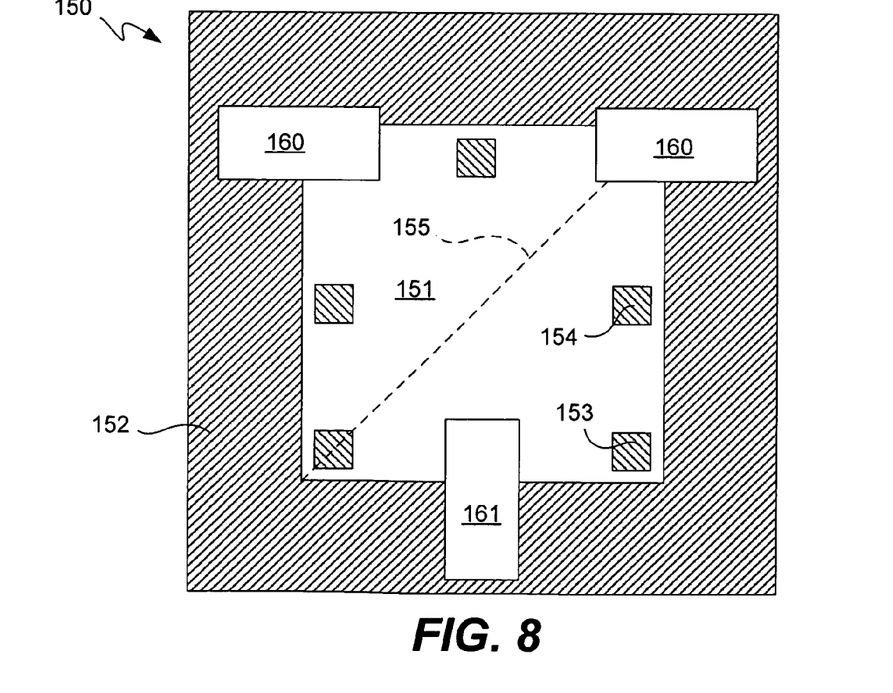
FIG. 8 illustrates in top plan view the RFIDIC of FIG. 6 having a particular antenna and ground lead arrangement attached to form an RFID tag according to one embodiment of the present invention.

Referring now to FIG. 8, the RFIDIC of FIG. 6 further comprising antennae attached in one particular arrangement to form an RFID tag according to one embodiment of the present invention is illustrated in top plan view. RFID tag 150 comprises the RFIDIC 151 illustrated in FIGS. 6 and 7, but now has the contact ends of two antennae leads 160 attached to two of the four corner poles 153, while the contact end of a ground lead or wire 161 is attached at an opposing side pole 154. In a particularly preferred embodiment, the ground lead or wire will eventually travel in its path along a substrate or other backing material (not shown) and connect with one or both of antennae leads 160, such an arrangement and connection as will be readily understood by those skilled in the art. In this illustrative example, it should be noted that the automated devices and methods used in the manufacturing process can be used to first align RFIDIC 151 such that one side of the chip is in a given location and direction, such as along a guide rail. A subsequent attachment of opposing antennae leads 160 and ground lead 161 in the exact position and formation as shown will then be successful so long as RFIDIC 151 is an a substantially correct location and has a substantially correct rotational orientation, which can be any "squared" rotational orientation (i.e., 0, 90, 180 or 270 degrees from "normal"). The term "substantially" is used here because any slight variance from a perfect overall location and any slight rotation of RFIDIC 151 from any of the four perfectly squared rotational orientations will result in a slightly skewed location and/or rotational orientation, whereby the normal attachment of antenna leads 160 and ground lead 161 will still result in a fully operable and functional RFID tag. Such a substantially correct location and rotational orientation can be readily had through use of some bulk parts handling systems, such that traditional pick and place methodologies are not necessary. Other details and advantages that may also apply are substantially similar to those discussed in the foregoing embodiment of FIGS. 3-5.

Figure 9A:
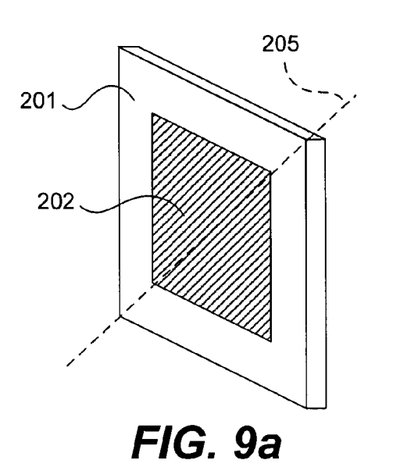
FIGS. 9a and 9b illustrate in front and back perspective views yet another exemplary RFIDIC having an alternative pole arrangement according to another embodiment of the present invention.
Figure 9B:
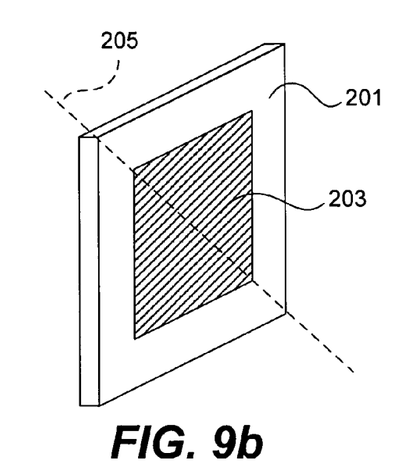

Turning now to FIGS. 9a and 9b, yet another exemplary RFIDIC having an alternative pole arrangement according to another embodiment of the present invention is illustrated in front and back perspective views. RFIDIC 201 may or may not be accompanied by a substrate or backing (not shown) on either side, similar to the foregoing embodiments. RFIDIC 201 comprises two poles 202 and 203, which are at least partially exposed regardless of the existence of any substrate or backing, and which are located on opposing front and back sides of the RFIDIC. As in each of the foregoing examples, poles 202 and 203 are poles adapted to be attached to one or more antenna leads, with such adaptations including the underlying chip circuitry connected to the poles being configured such that radio signals are to be received into and emitted from the RFIDIC through these poles, as will be readily understood by those skilled in the art.

As seen in FIGS. 9a and 9b, antenna poles 202 and 203 are both preferably centrally located along each respective side of RFIDIC 201, and each pole is preferably relatively large, although smaller poles are also possible, depending in part upon design preference and the level of precision inherent to any handling and antennae attachment apparatuses. As in the foregoing examples, the arrangement of antenna poles 202 and 203 is substantially symmetrical about at least one axis across the RFIDIC 201, such as, for example, diagonal axis 205. As will be appreciated, a substantial number of alternative axes of symmetry are also possible in this embodiment, especially in the event that the RFIDIC and/or poles are circular in nature rather than rectangular or square. As will also be readily appreciated, the antenna attachment process for this embodiment will be somewhat different than the antenna attachment process for the previous embodiment, as antennae must be attached to both the front and back sides of RFIDIC 201.

Again, while such a pole arrangement may require the creation of larger than normal contacts, the arrangement of poles in this embodiment likewise permits a virtually infinite number of possible rotational orientations of the RFIDIC at the antenna attachment stage, such that bulk feeders and handlers can be more readily implemented into the manufacturing process. In the typical instance of a simple RFID tag having a two-connection looped type antenna and capable of regular operation under either a normal or reversed attachment of the two antenna leads, virtually all rotational orientations, as well as either one of a face-up or face-down orientation, of RFIDIC 201 will result in the correct placement of antenna leads at the time such leads are attached to poles 202 and 203. Such a universally acceptance of either face-up or face-down and any rotational orientation is though to result in an RFIDIC embodiment having maximum flexibility with respect to the types and models of bulk handlers, feeders and other devices that can be used.

Figure 10:
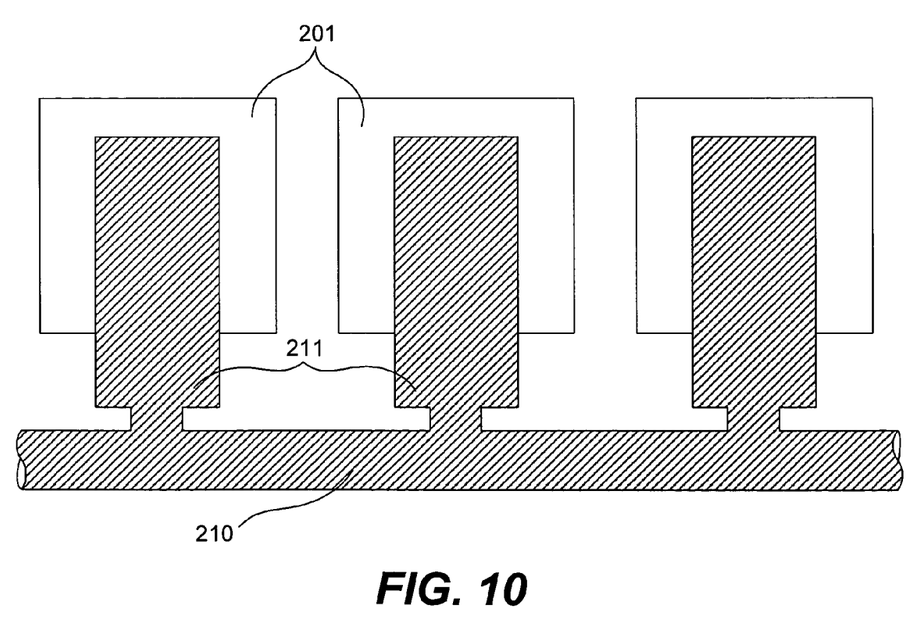
FIG. 10 illustrates in top plan view an exemplary chip arrangement used in the manufacture of RFIDICs according to one embodiment of the present invention.

With reference to FIG. 10, an exemplary chip arrangement used in the manufacture of RFID chips according to one embodiment of the present invention is illustrated in top plan view. In many manufacturing environments, lead-frame and lead-frame based technologies are one popular technique for mass-producing chips and other electronic components, and such techniques and methods are readily implemented in an RFID manufacturing context as well. In-process RFID chips 201, which may be similar to the finished RFIDIC 201 as illustrated in FIGS. 9a and 9b, are shown at one stage of a lead-frame based manufacturing process. These RFID chips 201 are connected to a common web or tie bar 210 via individual leads 211, which can be severed as desired at an appropriately designated time or process step, as will be readily understood by those skilled in the art. Other typical and inherent steps and formations in a lead-frame based manufacturing process (not shown) are also contemplated by the present invention, and all such typical steps and formations not shown, as well as that which is illustrated, can also be used for the manufacture of other RFIDIC embodiments as well, such as RFIDIC 101 and RFIDIC 151 described previously. Once an appropriate stage of the manufacturing process is reached, whereby each individual RFIDIC can be separated from the rest, bulk handlers and processors can then be optimally used to streamline the process.

Figure 11:
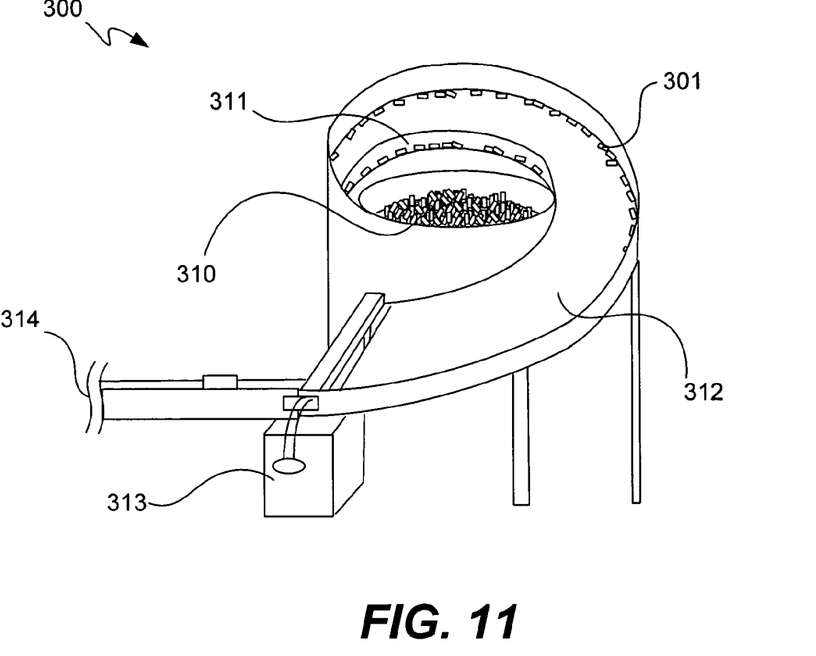
FIG. 11 illustrates in top perspective view an exemplary bulk-processing device for manufacturing RFID tags according to one embodiment of the present invention.

Turning now to FIG. 11, an exemplary bulk-processing device for manufacturing RFID tags according to one embodiment of the present invention is illustrated in top perspective view. Mass parts handling system 300 preferably comprises a centralized receptacle or bin 310 adapted to hold bulk-processed products 301 to be processed, and also typically adapted to at least assist in the initiation of the processing of such bulk-processed products. Such a mass parts handling system can be, for example, one of the various vibratory or rotary parts feeders manufactured under the Syntron® brand by FMC Technologies, Inc. of Chicago, Ill. In one embodiment, A Syntron® Model EB-00 parts feeder drive can be used in conjunction with a Model 5.5SW8-OT outside track bowl, although other standard and custom designed combinations can also be used to achieve a desirable result.

As also illustrated, an upward spiraling track 311 preferably begins within or near an edge of bin 310, wherein the processing and forwarding of bulk-processed products 301 begins. During operation, such bulk-processed products tend to be forced against a retaining wall of track 311 as they progress upward, such that some degree of separation and relatively single file alignment is typically obtained. After passing upward along track 311, bulk-processed products 301 (e.g., RFIDICs) eventually reach a preferably broadened final track section 312, whereupon they then preferably pass under or through a counting or tracking mechanism associated with a control device 313. After passing such a mechanism, products 301 are then preferably directed onto a separate processing belt or track 314, whereupon they are then transported away from bulk processor 300 and toward the next step in the manufacturing process, which could be, for example, an antenna attachment step.

Such a belt or track 314 may incorporate one or more guides, walls or other additional aligning apparatuses (not shown) to further regulate a single file, laterally aligned and spaced nature of the bulk-processed products as necessary, such manufacturing and processing techniques as will be readily understood by those skilled in the art. As set forth previously, the orientation of such bulk-processed products can be largely irrelevant where such products have incorporated one of the unique pole arrangement and chip designs disclosed herein, such that any rotational orientation is possible. Similarly, any face-up or face-down chip orientation will also be possible for some designs. If such flexibility in face up or down orientation is not possible, as in the case of RFIDICs 101 or 151, then the mass parts handler system can typically be modified to correct for such an instance. For example, a guide, wall or rail (not shown) can be implemented to flip over any upside chips as they pass, or, alternatively, such a guide or barrier can be used to divert improperly oriented chips back into the bin 300 as they attempt to pass a certain point in the spiral path 311.

The level of precision and automation that can be avoided through the abandonment of common pick and place methods in favor of such a bulk or mass parts handler is considerable. For example, were the orientation of a typical RFIDIC to matter at an antenna attachment step, then such RFIDICs could not be quickly and efficiently separated from a formation as depicted in FIG. 10 and deposited quickly, albeit haphazardly, into a mass parts handler bin 310. Instead, individualized care would be required for each RFIDIC, so as not to disturb the known to be correct orientation of the chip. Conversely, RFIDICs designed according to one or more of the exemplary embodiments provided herein can be subjected to the processing of a mass parts handler 300 or similar device, and do not require the use of a relatively more expensive and time consuming pick and place apparatus. Accordingly, a substantial amount of cost per part can be saved through the use of bulk processors and handlers, which use is made possible by a symmetrical or otherwise manipulatively useful chip and pole design.

Figure 12:
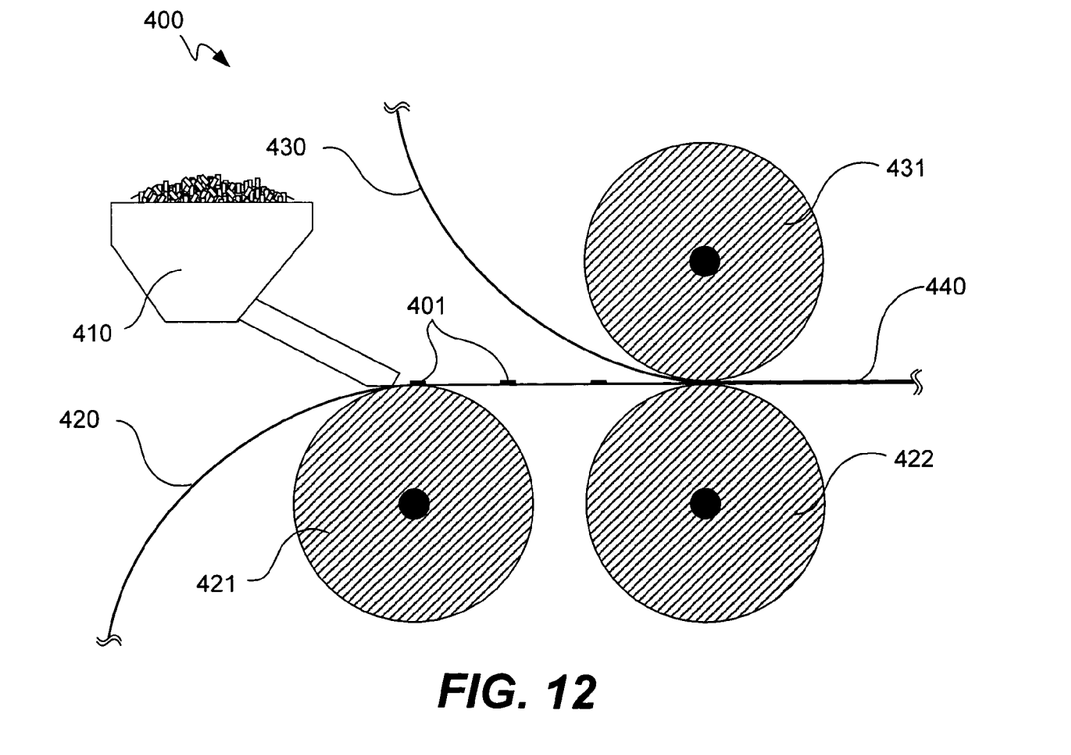
FIG. 12 illustrates in side view another exemplary bulk-processing device for manufacturing RFID tags according to another embodiment of the present invention.

Turning now to FIG. 12, another exemplary bulk-processing device for manufacturing RFID chips according to another embodiment of the present invention is illustrated in side cross-sectional view. Bulk processing system 400 is specifically designed for use with RFIDICs having poles on opposing sides, such as RFIDIC 201 as illustrated in FIGS. 9a and 9b. Bulk hopper or feeder 410 is a repository for individually separated RFIDICs 401 to be processed en mass. Again, such individual RFIDICs 401 can be separated and processed quickly in this manner, with orientation being irrelevant for the most part due to the symmetrical design of each chip and its poles. Each RFIDIC 401 is processed along or through a chute or other outlet of hopper 410, either randomly or via some additional automated means, as desired. For example, the outlet chute might be relatively full of product to be processed, but an automated gate at the end can be programmed to regulate the amount and speed at which product is ultimately released.

Upon release, each RFIDIC 401 slides or is otherwise placed onto a continuously moving sheet of substrate 420, into which antennae traces and leads may already be built. Similarly, a second continuously moving sheet of substrate 430 is provided, into which antennae traces and leads may also be already built. Such antenna substrate sheets 420 and 430 can originate from a roll or other source of material, as desired, and are preferably pulled along by a plurality of rollers such as rollers 421, 422 and 431, with additional rollers and/or guides in the process also being possible both before and after that which is illustrated. After traveling along for some length at a given location on substrate sheet 420, a particular RFIDIC 401 will encounter substrate sheet 430, which is directed over the top of the RFIDIC. At such a "sandwiching" of the RFIDIC between two antenna substrate sheets, the entire device passes through rollers 422 and 431.

Although such rollers can be used in part to guide the continuous sheets of antenna substrate, rollers 422 and 431 can also serve the dual purpose of press attaching the antennae to each RFIDIC 401. The resulting continuous RFID tag "sandwich" 440 that exits the rollers can then be cut or otherwise separated appropriately at some later process step (not shown). As will be readily appreciated, both continuous substrate sheets may have repeating antenna traces and patterns built in to the sheets, such that each RFIDIC can be ideally located at a central point on each pattern, and such that the cutting or separating of extruding product later can be more easily accomplished in a regulated pattern in order to form the final individual RIFD tags.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A radio frequency identification system, comprising:
   an antenna arrangement having a plurality of traces adapted to be attached to a plurality of RFID poles; and
   an RFID package including a radio frequency identification integrated circuit and a plurality of exposed poles arranged thereupon, wherein at least two of said plurality of traces on said antenna arrangement are directly and operatively attached to at least two of said plurality of exposed poles respectively, whereby said plurality of exposed poles are configured such that at least two of said plurality of antenna traces can be directly and operatively attached to at least two of said plurality of exposed poles when said RFID package is in any of at least three distinct rotational positions with respect to said antenna arrangement.

2. The radio frequency identification system of claim 1, wherein said plurality of exposed poles are arranged in a substantially symmetrical fashion about at least one axis along said RFID package.

3. The radio frequency identification system of claim 1, wherein said plurality of exposed poles are arranged such that at least two of said plurality of antenna traces can be directly and operatively attached to at least two of said plurality of exposed poles when said RFID package is at substantially any rotational position with respect to said antenna arrangement.

4. The radio frequency identification system of claim 1, wherein said plurality of exposed poles are arranged such that at least two of said plurality of antenna traces can be directly and operatively attached to at least two of said plurality of exposed poles regardless of whether said RFID package is either face-up or face-down with respect to said antenna arrangement.

5. The radio frequency identification system of claim 1, wherein said plurality of exposed poles includes exactly eight poles arranged in a square formation having four corner pole positions and four side pole positions, with one of said eight poles at each said position.

6. The radio frequency identification system of claim 5, wherein each of said four corner poles is adapted to be connected to an antenna lead, and wherein each of said four side poles is adapted to be connected to a power or ground lead.

7. The radio frequency identification system of claim 6, further including:
   a power source directly and operatively attached to one of said side poles, said power source adapted to provide power to said radio frequency identification integrated circuit via said one of said side poles.

8. The radio frequency identification system of claim 1, wherein said plurality of exposed poles includes exactly two oversized L-shaped poles arranged in a square formation, and wherein each of said two L-shaped poles has a polarity that is different than the other.

9. An RFID package, comprising:
   a radio frequency identification integrated circuit; and
   a plurality of exposed poles arranged thereupon, wherein said plurality of exposed poles are configured such that at least two antenna traces from an associated antenna arrangement can be directly and operatively attached to at least two of said plurality of exposed poles when said RFID package is in any of at least three distinct rotational positions with respect to said antenna arrangement.

10. The RFID package of claim 9, wherein said plurality of exposed poles are arranged in a substantially symmetrical fashion about at least one axis along said RFID package.

11. The RFID package of claim 9, wherein said plurality of exposed poles are arranged such that said at least two antenna traces can be directly and operatively attached to at least two of said plurality of exposed poles when said RFID package is at substantially any rotational position with respect to said antenna arrangement.

12. The RFID package of claim 9, wherein said plurality of exposed poles are arranged such that said at least two antenna traces can be directly and operatively attached to at least two of said plurality of exposed poles regardless of whether said RFID package is either face-up or face-down with respect to said antenna arrangement.

13. The RFID package of claim 9, wherein said plurality of exposed poles includes exactly eight poles arranged in a square formation having four corner pole positions and four side pole positions, with one of said eight poles at each said position.

14. The RFID package of claim 13, wherein each of said four corner poles is adapted to be connected to an antenna lead, and wherein each of said four side poles is adapted to be connected to a power or ground lead.

15. The RFID package of claim 9, wherein said plurality of exposed poles includes exactly two oversized L-shaped poles arranged in a square formation, and wherein each of said two L-shaped poles has a polarity that is different than the other.

* * * * *